INVENTOR
Bryan Webb, Jr.

3,026,470
CONTROL APPARATUS
Bryan Webb, Jr., Fayetteville, Ark., assignor to Westinghouse Electric Corporation, East Pittsburgh, Pa., a corporation of Pennsylvania
Filed Mar. 22, 1957, Ser. No. 647,911
6 Claims. (Cl. 323—43.5)

This invention relates to electrical control apparatus, and more particularly to regulator systems.

In applications of control systems for induction regulators, step-type regulators, and for tap-changing transformers the conventional control systems include a number of components having moving parts. For maximum reliability, it is desirable that as many components as possible of the control system for the above-mentioned devices be static components having no moving parts. Also from a maintenance standpoint, it is desirable that the control systems should comprise static components.

An object of this invention is to provide a new and improved electrical control system.

Another object of this invention is to provide a new and improved regulator system making use of static electrical components.

A more specific object of this invention is to provide a static control system adapted for controlling the motor driven apparatus which is part of a step-type regulator, a tap-changing transformer, or an induction regulator.

Other objects of this invention will in part be obvious and will in part appear hereinafter.

For a fuller understanding of the nature and objects of this invention, reference should be had to the following detailed description taken in connection with the accompanying drawings, in which.

Figure 1:
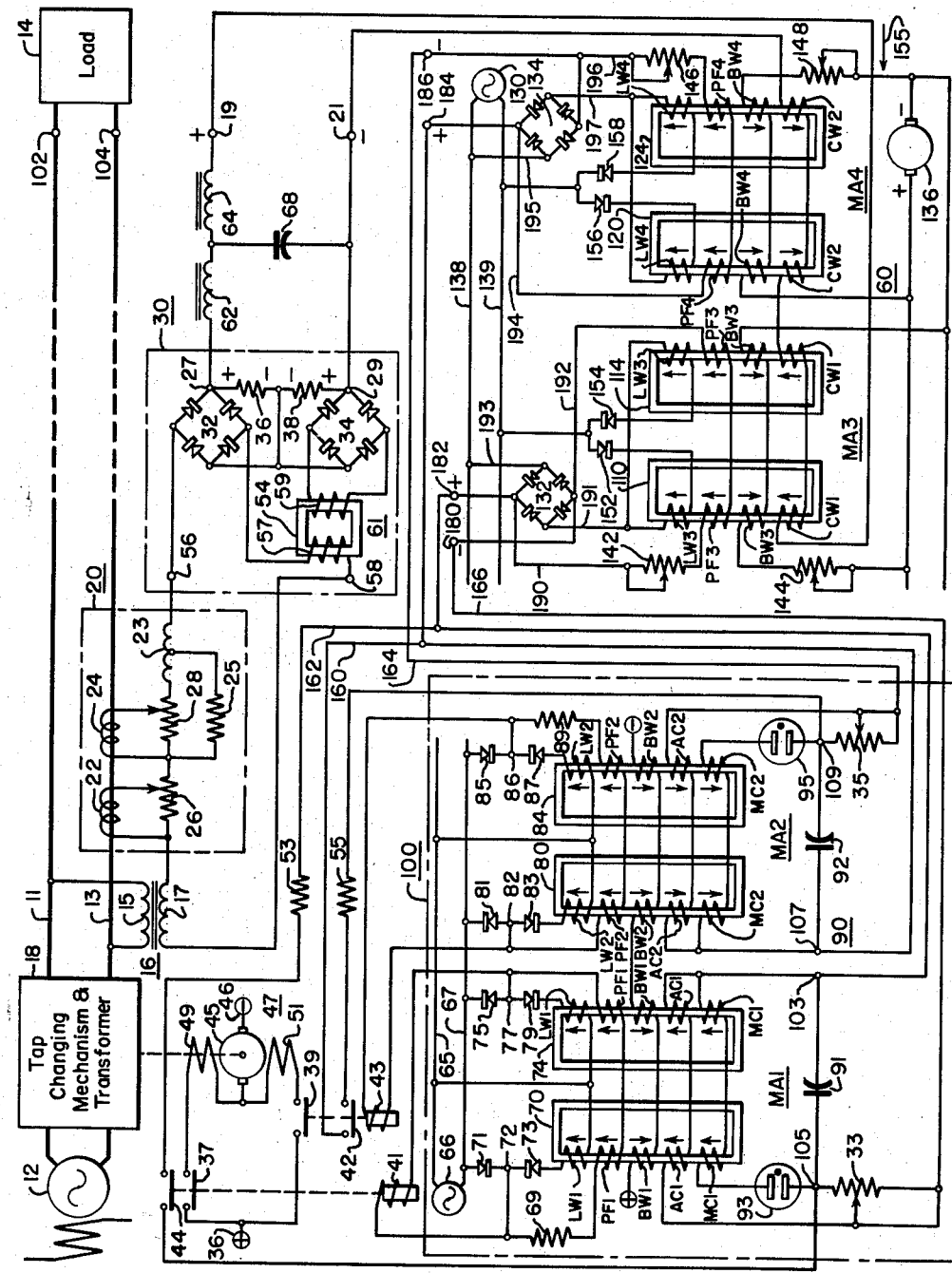
FIGURE 1 is a schematic diagram, partially in block form, of one embodiment of my invention.

Referring now to the drawings and FIG. 1 in particular, there is illustrated an alternating current source 12 disposed to supply power to a load 14 through the tap-changing mechanism and transformer which is shown in block form and designated by the reference numeral 18. The transformer included as part of the tap-changing mechanism and transformer 18 has a plurality of taps on either the primary or secondary winding thereof and an associated tap-changing mechanism controlled by a reversible motor 47 in the manner which is well known in the art. In order to maintain the voltage at the terminals 102 and 104 of the load 14 at substantially a predetermined value, a regulator loop 10 is interconnected between the output of the tap-changing mechanism and transformer 18 at conductors 11 and 13 and the reversible motor 47 which controls the tap-changing transformer 18. In general, the regulator system 10 comprises a potential transformer 16 for obtaining a measure of the line voltage of the regulated circuit at conductors 11 and 13; a line drop compensating circuit 20 for adjusting the output voltage of the potential transformer 16 to the extent of a voltage which is proportional to the voltage drop in the regulated circuit between the point where the potential transformer 16 is connected and the load 14; an error sensing circuit 30 for producing a direct current error signal which is a measure of the deviation of the voltage at the terminals 102 and 104 of the load 14 from its regulated value; a bistable magnetic amplifier 60 responsive to the direct current error signal; a time delay circuit 100 for coupling the output of the bistable magnetic amplifier 60 to the output of the time delay circuit 100 so as to control the operation of the reversible motor 47 after a predetermined time delay.

As illustrated, the primary winding 15 of the potential transformer 16 is connected across the regulated circuit conductors 11 and 13. The output of the secondary winding 17 of the potential transformer 16 is connected to the input terminals of the error sensing circuit 30, the lead at the left end being connected directly to the terminal 58 and the lead at the right end of the secondary winding 17 connected to the terminal 56 of the sensing circuit 30 through the line drop compensating circuit 20. The voltage supplied to the input terminals 56 and 58 of the sensing circuit 30 by the potential transformer 16 is a measure of the line voltage of the regulated circuit which appears at conductors 11 and 13 as modified by the voltage across the line drop compensating circuit 20.

In particular, the line drop compensating circuit 20 comprises rheostats 26 and 28, a resistor 25 and a tapped reactor 23 connected in circuit relationship so that a current proportional to the line current of the regulated circuit is circulated through these components by current transformers 22 and 24. The values of these components of the line drop compensating circuit 20 are proportioned so that the voltage introduced between the output of the potential transformer 16 and the terminal 56 of the sensing circuit 30 is proportional to the voltage drop across the resistance and reactance of the regulated circuit between the point where the potential transformer 16 is connected at line conductors 11 and 13 and the terminals 102 and 104 of the load 14. A detailed description and explanation of the operation of the line drop compensating circuit 20 may be found in the copending application Serial No. 644,557, filed March, 1957, by James T. Carleton and assigned to the assignee of the present application.

The error sensing circuit 30 comprises a saturating transformer 61 having a core 54 and windings 57 and 59, full wave rectifiers 32 and 34 and resistors 36 and 38 connected in circuit relationship. The vector sum of the output voltage of the potential transformer 16 and the voltage across the line drop compensating circuit 20 are imposed at the input terminals 56 and 58 of the sensing circuit 30. The full wave rectifier 32 and the winding 57 of the saturating transformer 61 are connected in series circuit relationship across the input terminals 56 and 58 of the sensing circuit 30 so as to produce a direct current voltage across the resistor 36 which is substantially proportional to the alternating current voltage at the input terminals 56 and 58. The full wave rectifier 34 is connected across the winding 59 of the saturating transformer 61 so as to produce a substantially constant direct current reference voltage across the resistor 38. The net difference voltage between the reference voltage and the voltage across the resistor 36 which is proportional to the alternating current voltage at the input terminals 56 and 58 appears at the output terminals 27 and 29 of the sensing circuit 30. The polarity of the direct current output voltage of the sensing circuit 30 depends upon whether the reference voltage across the resistor 38 is greater or less than the voltage across the resistor 36 which is proportional to the alternating current voltage at the input terminals 56 and 58. A detailed description and explanation of the operation of the sensing circuit 30 may be found in copending application Serial No. 566,918, filed February 21, 1956, by Robert E. Humphrey and assigned to the assignee of the present application. The output error voltage of the sensing circuit 30 is filtered by the capacitor 68 and the inductances 62 and 64 which form a T-filter and the filtered error voltage appears at the terminals 19 and 21. This prevents undesirable signals from being applied to the control windings CW1 and CW2 of the bistable magnetic amplifier 60.

As illustrated, the bistable magnetic amplifier 60 comprises two main sections MA3 and MA4. The section MA3 comprises two magnetic core members 110 and 114; and the section MA4 comprises two magnetic core members 120 and 124. In this instance, the load windings LW3 and LW4 are disposed in inductive relationship with the magnetic core members 110, 114, 120 and 124, respectively. As is customary, self-saturation for the magnetic amplifier 60 is obtained by connecting in series circuit relationship with the load windings LW3 and LW4 self-saturating rectifiers 152, 154, 156 and 158, respectively.

In order to form a doubler circuit of the section MA3, the series circuit including one of the load windings LW3 and the self-saturating rectifier 152 is connected in parallel circuit relationship with the series circuit including the other of the load windings LW3 and the self-saturating rectifier 154. In like manner, in order to form a doubler circuit of the section MA4, the series circuit including one of the load windings LW4 and the self-saturating rectifier 156 is connected in parallel circuit relationship with the series circuit including the other of the load windings LW4 and the self-saturating rectifier 158.

Energy for the load windings LW3 and LW4 of the magnetic amplifier 60 is received from an alternating current source 130 which supplies power to the conductors 138 and 139. As illustrated, a full-wave load rectifier 132 is interconnected with the hereinbefore described parallel circuit of the section MA3 and with the conductors 138 and 139 from the alternating current source 130 in order to produce a direct current output for the section MA3. In like manner, a full-wave load rectifier 134 is interconnected with the hereinbefore described parallel circuit of the section MA4 and with the conductors 138 and 139 from the alternating current source 130. The direct current output voltage of the section MA3 appears at the terminals 180 and 182, the terminal 182 being positive with respect to the terminal 180. The direct current output voltage of the section MA4 appears at the terminals 184 and 186, the terminal 184 being positive with respect to the terminal 186.

The positive feedback windings PF3 of the magnetic amplifier 60 are connected to the output terminals 180 and 182 of the section MA3 through the conductors 190 and 192 and the rheostat 142. In like manner, the positive feedback windings PF4 are connected to the output terminals 184 and 186 of the section MA4 through the conductors 194 and 196 and the rheostat 146. In operation, the current flow through the positive feedback windings PF3 and PF4 produces a magnetomotive force with respect to their respective magnetic core members that aids the magnetomotive force produced by the current flow to the load windings LW3 and LW4, respectively.

For the purpose of biasing each of the sections MA3 and MA4 of the magnetic amplifier 60, the bias windings BW3 and BW4 are disposed in inductive relationship with the magnetic core members 110, 114, 120 and 124. The bias windings BW3 are serially connected across the direct current source 136 through the rheostat 144. In like manner, the bias windings BW4 are serially connected across the direct current source 136 through the rheostat 148. In operation, the current flow through the bias windings BW3 and BW4 produces a magnetomotive force with respect to their respective magnetic core members that opposes the magnetomotive force produced by the current flow through the load windings LW3 and LW4, respectively. The rheostats 144 and 148 are provided in order to vary the current which flows through the bias windings LW3 and LW4, respectively.

The control windings CW1 and CW2 are disposed in inductive relationship with the magnetic core members 110, 114, 120 and 124, respectively. The control windings CW1 and CW2 are connected in series circuit relationship with one another, the series circuit being connected across the filtered output voltage of the sensing circuit 30 at terminals 19 and 21. The control windings CW1 are so disposed on their respective magnetic core members 110 and 114 that when current flows therethrough as indicated by the direction of the arrow 155 a magnetomotive force is produced in their respective magnetic core members that aids the magnetomotive force produced by the current flow through the respective load windings LW3. The control windings CW2 are so disposed on their respective magnetic core members 120 and 124 that when current flows therethrough, as indicated by the direction of the arrow 155, a magnetomotive force is produced in the respective magnetic core members that opposes the magnetomotive force produced by the current flow through the respective load windings LW4.

Figure 3:
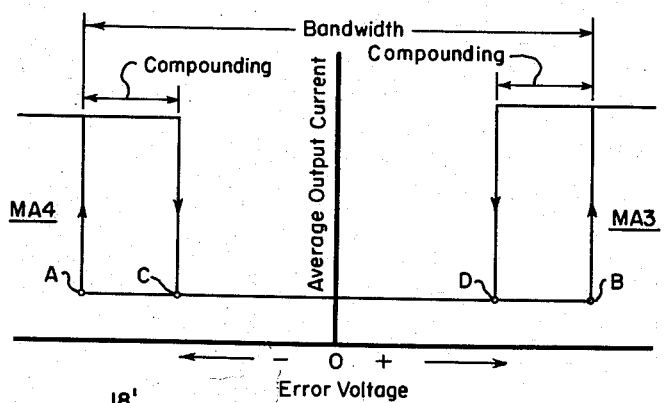
FIG. 3 is a coordinate plot of the average output current of the bistable magnetic amplifier shown in FIG. 1 as a function of the error voltage obtained from the error sensing circuit shown in FIG. 1.

The operation of the magnetic amplifier 60 described above will be more easily understood by referring to FIG. 3. The bias windings BW3 and BW4 will bias the sections MA3 and MA4 of the magnetic amplifier 60 beyond cutoff with zero output voltage from the sensing circuit 30. The amount of positive feedback current applied to the positive feedback windings PF3 and PF4 will be adjusted by the rheostats 142 and 146 so that the magnetic amplifier 60 will have the bistable characteristic shown in FIG. 3. If the magnitude of the output error voltage from the sensing circuit 30 increases from zero in either a positive or negative direction to a value as indicated at A or B of FIG. 3, the output current of one of the sections MA3 and MA4 will increase from a negligible value to a predetermined value as indicated in FIG. 3. If the voltage at the terminals 102 and 104 increases to a value above the regulated value, then the polarity of the output voltage of the sensing circuit 30 will be such that the current will flow from terminal 19 as indicated by the arrow 155 and the output current of the section MA3 will increase when the magnitude of the error voltage from the sensing circuit 30 increases to the value indicated at B, as shown in FIG. 3. If the value of the voltage at terminals 102 and 104 falls below the regulated value, the output voltage of the sensing circuit 30 will cause a current to flow in the control windings CW1 and CW2 of the magnetic amplifier 60 opposite to the direction indicated by the arrow 155. The output current of the section MA4 will then increase to a predetermined value when the error voltage increases to the value indicated at A, shown in FIG. 3. If the error voltage from the sensing circuit 30 should increase beyond the values indicated at A and B as shown in FIG. 3 and then decrease, then the output current of the sections MA3 and MA4 would remain at the predetermined value indicated in FIG. 3 until the error voltage had decreased to the value indicated at D or C in FIG. 3. As indicated in FIG. 3, the bandwidth of the regulator system 10 is the range of error voltage above and below the regulated value in which the magnitude of the error voltage may increase in a positive or negative direction before one of the sections MA3 and MA4 will increase its output current to the predetermined value indicated in FIG. 3.

In general, therefore, the bistable magnetic amplifier 60 operates to provide a predetermined value of output current at the output terminals of one of its sections MA3 and MA4 when the magnitude of the error voltage obtained from the sensing circuit 30 increases to a predetermined value of either polarity. The polarity of the output voltage of the sensing circuit which appears at the terminals 19 and 21 determines whether the section MA3 or the section MA4 of the magnetic amplifier 60 produces the predetermined value of output current. As previously defined, the bandwidth of the regulator system 10 may be varied by changing the bias current applied to the bias windings BW3 and BW4 of the magnetic amplifier 60 by adjusting the rheostats 144 and 148, respectively. The amount of compounding of the regulators system 10 is defined as the difference between the output voltage from the sensing circuit 30 necessary to produce the predetermined output current from one of the sections MA3 or MA4 of the magnetic amplifier 60 and the voltage to which the error voltage decreases before the predetermined output current decreases to a negligible value. The amount of compounding is controlled by the amount of positive feedback current applied to the feedback windings PF3 and PF4 of the magnetic amplifier 60 and is adjusted by the rheostats 142 and 146, respectively. A certain amount of compounding insures positive operation of the regulator system 10 and permits the regulator system 10 to properly provide a step correction to the regulated voltage at the load 14 in a manner consistent with the step correction that step-type regulators inherently provide. As previously defined, the bandwidth setting of the rheostats 144 and 148 determines the range in which the regulator system 10 operates to correct the voltage at the load 14. A minimum bandwidth is necessary in order to prevent too frequent operation of the tap-changing mechanism and transformer 18.

The time delay circuit 100 comprises a second bistable magnetic amplifier 90 having two sections MA1 and MA2. The section MA1 has the load windings LW1 connected to a bridge rectifier including the rectifiers 71, 73, 75 and 79 and to the alternating current source 66 at the conductors 65 and 67 so as to provide a self-saturating magnetic amplifier having a direct current output such that the output terminal 72 is positive with respect to terminal 77. Similarly, the load windings LW2 of the section MA2 are connected to the rectifiers 81, 83, 85 and 87 and to the source of alternating current 66 at conductors 65 and 67 so as to provide a self-saturating magnetic amplifier having a direct current output voltage such that the terminal 86 is positive with respect to the terminal 82. The positive feedback windings PF1 are connected to the output terminals 72 and 77 through the resistor 69 and the positive feedback windings PF2 are connected to the terminals 82 and 86 through the resistor 89. The bias windings BW1 and BW2 are serially connected across a single direct current source. The auxiliary control windings AC1 are serially connected across the D.C. output terminals 180 and 182 of the section MA3 of the magnetic amplifier 60. The auxiliary control windings AC2 are serially connected across the output terminals 184 and 186 of the section MA4 of the magnetic amplifier 60. The windings MC1 of the section MA1 are connected in series circuit relationship with the gas discharge tube 93 and the potentiometer 33, the series circuit being connected in parallel circuit relationship with the auxiliary control windings AC1. The capacitor 91 is connected in parallel circuit relationship with the windings MC1 through the gas discharge tube 93. In like manner, the windings MC2 of the section MA2 are connected in series circuit relationship with the gas discharge tube 95 and the potentiometer 35, the series circuit being connected in parallel circuit relationship with the auxiliary control windings AC2. The capacitor 92 is connected in parallel circuit relationship with the windings MC2 through the gas discharge tube 95.

In general, the operation of the magnetic amplifier 90 is similar to the operation of the magnetic amplifier 60. The bias windings BW1 and BW2 bias the sections MA1 and MA2 beyond cutoff. In order to produce an output current from the section MA1 or the section MA2, it is necessary that the output current from one of the sections MA3 or MA4 of the magnetic amplifier 60 be applied to both the auxiliary windings AC1 and to the windings MC1 of the section MA1 or to both the auxiliary control windings AC2 and the windings MC2 of the section MA2. The output current from the section MA4 of the magnetic amplifier 60 is applied directly to the auxiliary control windings AC2 of the magnetic amplifier 90. The output current of the section MA3 of the magnetic amplifier 60 is applied directly to the auxiliary control windings AC1 of the magnetic amplifier 90. The output current of the section MA4 of the magnetic amplifier 60 is applied to the windings MC2 of the magnetic amplifier 90 through the potentiometer 35 and the gas discharge tube 95. The gas discharge tube 95 does not allow the output current to be applied to the windings MC2 until the output current from the section MA4 has caused the capacitor 92 to charge through the resistance of the potentiometer 35 up to the voltage necessary to cause the gas discharge tube 95 to break down and apply the output current from the section MA4 to the windings MC2. The period of time during which the output current from the section MA4 must be applied before the gas discharge tube breaks down and allows current to flow through the windings MC2 is determined by the time constant of the resistance-capacitance circuit formed by the capacitor 92 and the potentiometer 35. The operation of the gas discharge tube 93, the potentiometer 33 and the capacitor 91 is exactly the same with respect to the windings MC1 as the operation of the gas discharge tube 95, the potentiometer 35 and the capacitor 92 are with respect to the windings MC2. In general, the operation of the magnetic amplifier 90 is to produce an output current at the output terminals 72 and 77 of the section MA1 or at the output terminals 82 and 86 of the section MA2 after a predetermined time interval during which the output current from one of the sections MA3 or MA4 is applied to the control windings AC1 and MC1 or to the control windings AC2 and MC2 of the sections MA1 or MA2, respectively. The output current from the section MA1 or the section MA2 will then continue with only the output current from the section MA3 or the section MA4 applied to the winding MC1 or to the winding MC2, respectively. The amount of time delay introduced by the magnetic amplifier 90 may be adjusted by the setting of the potentiometers 33 and 35 in the sections MA1 and MA2, respectively. A detailed description and explanation of the operation of the time delay circuit 100 may be found in the United States Patent 2,752,556 issued to me and G. D. Throop, June 26, 1956, and assigned to the assignee of the present application.

The output terminals of the magnetic amplifier 90 are connected so as to control the operation of the reversible motor 47. In particular, the relay 41, having contacts 37 and 44, is connected across the output terminals 72 and 77 of the section MA1 of the magnetic amplifier 90 and the relay 43, having contacts 39 and 42, is connected across the output terminals 82 and 86 of the magnetic amplifier 90. If the predetermined output current from the section MA3 of the magnetic amplifier 60 is applied to the windings AC1 and MC1 for the necessary predetermined time interval then the relay 41 will be energized by the output current from the output terminals 72 and 77 of the section MA1 of the magnetic amplifier 90. If the output current from the section MA4 of the magnetic amplifier 60 is applied to the windings AC2 and MC2 of the section MA2 of the magnetic amplifier 90 for the necessary predetermined time interval, the relay 43 will be energized by the output current from the output terminals 82 and 86 of the section MA2.

The reversible motor 47 comprises an armature 45 and two field windings 51 and 49 which are respectively serially connected with the armature 45 across the terminals 36 and 46 through the contacts 39 and 37 of the relays 43 and 41, respectively. The reversible motor turns in one direction if the contact 37 is closed when the relay 41 is energized and in the other direction when the contact 39 is closed when the relay 43 is energized. The second contact 44 of the relay 41 closes to connect the resistor 53 across the capacitor 91 and discharge the capacitor 91 whenever the relay 41 is energized in order to reset the time delay introduced by the time delay circuit 100. In similar manner, the second contact 42 of the relay 43 closes to place the resistor 55 across the capacitor 92 and discharge the capacitor 92 whenever the relay 43 is energized and thus reset the time delay introduced by the section MA2 of the time delay circuit 100.

The operation of the complete regulator system 10 will now be considered. If the voltage at the terminals 102 and 104 of the load 14 increases to a value above the regulated value, an output error voltage will appear across the terminals 27 and 29 of the sensing circuit 30 which is responsive to the line voltage of the regulated circuit as it appears across the output of the potential transformer 16 and as adjusted by the line drop compensating circuit 20. Under the assumed condition, when the output error voltage from the sensing circuit reaches a predetermined value, a predetermined output current will appear at terminals 180 and 182 of the section MA3 of the magnetic amplifier 60. If the output current from the section MA3 continues for a predetermined time interval, an output current will appear at the output terminals 72 and 77 of the section MA1 of the magnetic amplifier 90 and the relay 41 will be energized. The reversible motor 47 will then be energized by the contact 37 and the tap-changing mechanism in the transformer will be adjusted to decrease the voltage at the terminals 102 and 104 of the load 14 back down to the regulated value. In similar fashion, if the voltage at the terminals 102 and 104 of the load 14 falls below the regulated value and the requirements of magnitude and time duration of the error voltage from the sensing circuit 30 are met, the sections MA4 and MA2 of the magnetic amplifiers 60 and 90, respectively will produce output currents which will cause the relay 43 to be energized. The reversible motor 47 will then turn in the opposite direction to cause the tap-changing mechanism and transformer 18 to increase the voltage at the terminals 102 and 104 of the load 14 to the regulated value.

Small variations in the magnitude of the voltage at the load 14 will not cause the tap-changing mechanism and transformer 18 to operate unless the variation reaches a predetermined magnitude determined by the characteristics of the bistable magnetic amplifier 60. Variations in the voltage at the load 14 of a short duration, even if of the required magnitude to cause an output current from the magnetic amplifier 60, will not cause the tap-changing mechanism and transformer 18 to operate unless the variation lasts a predetermined time interval dependent upon the setting of the time delay circuit 100.

Figure 2:
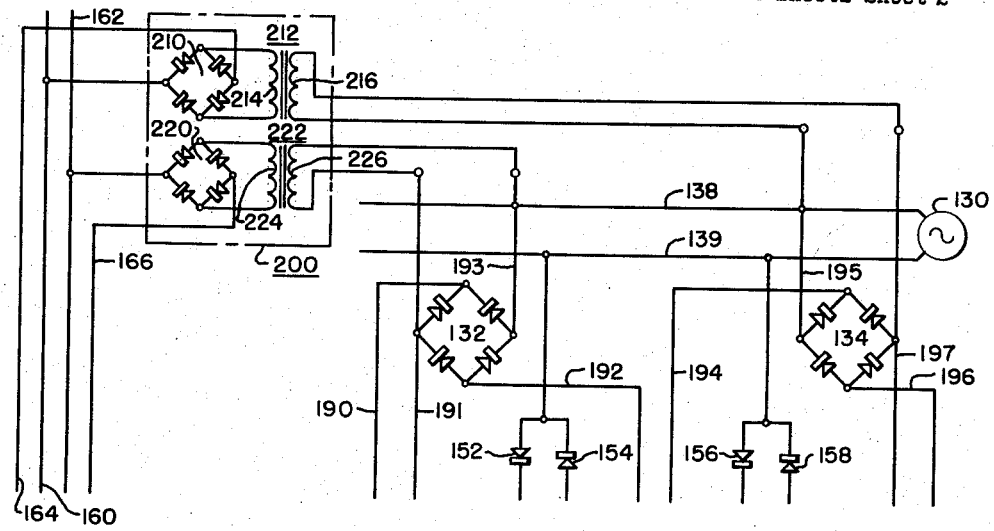
FIG. 2 is a schematic diagram illustrating an alternate arrangement for the connection between the bistable magnetic amplifier and the time delay circuit shown in FIG. 1.

Referring to FIG. 2, there is illustrated an alternate connection between the bistable magnetic amplifier and the time delay circuit 100. In general, this arrangement introduces a step-up means 200 between the output terminals of the magnetic amplifier 60 and the conductors 164, 162 and 166 which connect the output of the bistables magnetic amplifier 60 to the windings AC1, AC2, MC1 and MC2 of the magnetic amplifier 90. Instead of taking a direct current output across the terminals 180 and 182 of the full-wave rectifier 132 or across the terminals 184 or 186 of the full-wave rectifier 134, an alternating current output is taken from the sections MA3 and MA4 of the magnetic amplifier 60 at the conductors 191 and 193 of the section MA1 and conductors 195 and 197 of the section MA4. The alternating current output from the section MA3 at the conductors 191 and 193 is connected across the primary winding 226 of the transformer 222 in the step-up circuit 200. The alternating current output of the section MA4 at the conductors 195 and 197 is connected to the primary winding 216 of the transformer 212 in the step-up circuit 200. The output voltages of the transformers 222 and 212 appearing across the secondary windings 224 and 214, respectively, are rectified by the full-wave rectifiers 220 and 210, respectively. The direct current output of the full-wave rectifier 220 is connected across the conductors 162 and 166 and is applied, as in the circuit of FIG. 1, to the windings AC2 and MC2 of the section MA2 of the magnetic amplifier 90. In similar fashion, the direct current output of the full-wave rectifier 210 is connected across the conductors 160 and 164 and applied, as in the circuit of FIG. 1, to the windings AC1 and MC1 of the section MA1 of the magnetic amplifier 90. The balance of the circuit employed with the components shown in FIG. 2 would be the same as the circuit shown in FIG. 1.

The control system for an induction regulator would be the same as shown in FIG. 1 except that the time delay circuit 100 would be omitted.

Figure 4:
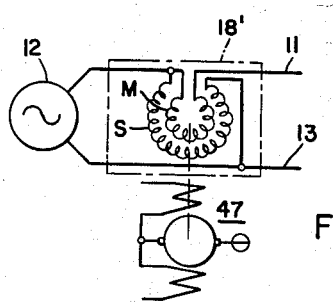
FIG. 4 is a partial schematic diagram illustrating a second embodiment of my invention.

Referring to FIG. 4, there is shown a conventional induction voltage regulator 18', which may be substituted for the tap changing mechanism and transformer 18 shown in FIG. 1, having a movable winding M and a stationary winding S. The motor 47 may then be employed to change the output voltage of said movable winding by changing the relative positions of said stationary and movable windings in a well-known manner. The balance of the control system except for the omission of the time delay circuit 100 would be the same as shown in FIG. 1.

It is to be understood that the control system shown in FIG. 1 may be applied to control the operation of a step-type voltage regulator as well as a tap-changing mechanism and transformer as shown in FIG. 1. It is also to be understood that other types of sensing circuits may be substituted for the sensing circuit shown in FIG. 1 provided that the sensing circuit produces a net error voltage whose polarity depends upon whether the sensed voltage is above or below the reference voltage.

It will be readily appreciated that well known methods of cross current compensation may be added to the control system shown in FIG. 1 to provide for proper parallel operation of the tap-changing mechanism and transformer 18 with other units of a similar type.

It is to be understood that the motor control relays shown in FIG. 1 may be replaced by static devices in order to make the control system illustrated completely static.

The apparatus embodying the teachings of this invention has several advantages. For instance, the regulator system 10, except for the motor control relays 41 and 43, comprises static components, thus minimizing maintenance problems. In addition, the bistable magnetic amplifier 60 allows for variation of the bandwidth and compounding of the regulator system 10 and the time delay circuit 100 provides for the introduction of an adjustable time delay in the operation of the regulator system 10.

Since numerous changes may be made in the above-described apparatus and circuits and different embodiments of the invention may be made without departing from the spirit thereof, it is intended that all matter contained in the foregoing description or shown in the accompanying drawings shall be interpreted as illustrative and not in a limiting sense.

I claim as my invention:

1. In a voltage regulating system for an alternating current circuit including a transformer having primary and secondary windings and a driven apparatus for changing the secondary voltage of said transformer by changing taps on said windings, first means connected in circuit relation with said secondary winding for obtaining a measure of said secondary voltage, second means conencted in circuit relation with said first means for compensating said measure of said secondary voltage for the voltage drop in a particular section of said alternating current circuit, said first means and said second means being connected in series circuit relationship, third means connected in circuit relation with said first and second means for comparing said compensated measure of said secondary voltage with a reference voltage to produce a net error voltage, fourth means connected in circuit relation with said third means to be responsive to values of said error voltage larger than a predetermined magnitude for producing substantially a predetermined output signal, said fourth means comprising a bistable magnetic amplifier having a load winding for producing said output signal, a control winding, a bias winding and a feedback winding, said error voltage being applied as an input signal to said control winding, the feedback current applied to said feedback winding being variable to change the compounding of said regulating system, the bias current applied to said bias winding being variable to change the bandwidth of said regulating system, fifth means connected in circuit relation between said fourth means and said driven apparatus to be responsive to said output signal for controlling the operation of said motor driven apparatus, said fifth means being connected in circuit relationship with said load winding of said magnetic amplifier, and a separate adjustable time delay circuit connected in circuit relation between said fourth means and said fifth means for coupling said output signals of a duration longer than a predetermined value to said fifth means.

2. In a voltage regulating system for an alternating current circuit including a transformer having primary and secondary windings and a driven apparatus for changing the secondary voltage of said transformer by changing taps on said windings, first means connected in circuit relation with said secondary winding for obtaining a measure of said secondary voltage, second means connected in circuit relation with said first means for comparing said measure of said secondary voltage with a reference voltage to produce a net error voltage, third means connected in circuit relation with said second means to be responsive to values of said error voltage larger than a predetermined magnitude for producing substantially a predetermined output signal, said third means comprising a bistable magnetic amplifier having a load winding for producing said output signal, a control winding, a bias winding and a feedback winding, said error voltage being applied as an input signal to said control winding, the feedback current applied to said feedback winding being variable to change the compounding of said regulating system, the bias current applied to said bias winding being variable to change the bandwidth of said regulating system, fourth means connected in circuit relation between said third means and said driven apparatus to be responsive to said output signal for controlling the operation of said driven apparatus, said fourth means being connected in circuit relationship with said load winding of said magnetic amplifier, and a separate adjustable time delay circuit connected in circuit relation between said third means and said fourth means for coupling said output signals of a duration longer than a predetermined value to said fourth means.

3. In a voltage regulating system for an alternating current circuit including a transformer having a primary and secondary windings and a motor driven apparatus for changing the secondary voltage of said transformer by changing taps on said windings, first means connected in circuit relation with said secondary winding for obtaining a measure of said secondary voltage, second means connected in circuit relation with said first means for compensating said measure of said secondary voltage for the voltage drop in a particular section of said alternating current circuit, said first means and said second means being connected in series circuit relationship, third means connected in circuit relation with said first and second means for comparing said compensated measure of said secondary voltage with a reference voltage to produce a net error voltage, fourth means connected in circuit relation with said third means to be responsive to values of said error voltage larger than a predetermined magnitude for producing substantially a predetermined output signal, said fourth means comprising a first bistable magnetic amplifier having a load winding for producing said output signal, a control winding, a bias winding and a feedback winding, said error voltage being applied as an input signal to said control winding, the feedback current applied to said feedback winding being variable to change the compounding of said regulating system, the bias current applied to said bias winding being variable to change the bandwidth of said regulating system, fifth means connected in circuit relation between said fourth means and said driven apparatus to be responsive to said output signal for controlling the operation of said motor driven apparatus, said fifth means being connected in circuit relationship with said load winding of said magnetic amplifier, and an adjustable time delay circuit connected in circuit relation between said fourth means and said fifth means, said time delay circuit comprising a second bistable magnetic amplifier having a plurality of windings and a resistance and a reactance, one of said windings being responsive to a predetermined magnitude of said output signal from said fourth means of a duration determined by the time constant of said resistance and said reactance connected in circuit relationship, and another of said windings being connected to couple said output signals of a duration longer than a predetermined value to said fifth means.

4. In a voltage regulating system for an alternating current circuit including a transformer having primary and secondary windings and a motor driven apparatus for changing the secondary voltage of said transformer by changing taps on said windings, first means connected in circuit relation with said secondary winding for obtaining a measure of said secondary voltage, second means connected in circuit relation with said first means for comparing said measure of said secondary voltage with a reference voltage to produce a net error voltage, third means connected in circuit relation with said second means to be responsive to values of said error voltage larger than a predetermined magnitude for producing substantially a predetermined output signal, said third means comprising a first bistable magnetic amplifier having a load winding for producing said output signal, a control winding, a bias winding and a feedback winding, said error voltage being applied as an input signal to said control winding, the feedback current applied to said feedback winding being variable to change the compounding of said regulating system, the bias current applied to said bias winding being variable to change the bandwidth of said regulating system, fourth means connected in circuit relation between said third means and said driven apparatus to be responsive to said output signal for controlling the operation of said motor driven apparatus, said fourth means being connected in circuit relationship with said load winding of said magnetic amplifier, and an adjustable time delay circuit connected circuit relation between said third means and said fourth means, said time delay circuit comprising a second bistable magnetic amplifier having a control winding and an output load winding and a resistance and a reactance, said control winding being responsive to a predetermined magnitude of said output signal from said third means of a duration determined by the time constant of said resistance and said reactance connected in circuit relationship, said load winding being connected to couple said output signals of a duration longer than a predetermined value to said fourth means.

5. In a voltage regulating system for an alternating current circuit including an induction voltage regulator having stationary and movable windings and a driven apparatus for changing the output voltage of said movable winding of said induction regulator by changing the relative positions of said stationary and movable windings, first means connected in circuit relation with said windings for obtaining a measure of said output voltage, second means connected in circuit relation with said first means for compensating said measure of said output voltage for the voltage drop in a particular section of said alternating current circuit, said first and second means being connected in series circuit relationship, third means connected in circuit relation with said first and second means for comparing said compensated measure of said output voltage with a reference voltage to produce a net error voltage, fourth means connected in circuit relation with said third means to be responsive to values of said error voltage larger than a predetermined magnitude for producing substantially a predetermined output signal, said fourth means comprising a bistable magnetic amplifier having a load winding for producing said output signal and a control winding and a bias winding and a feedback winding, said error voltage being applied as an input signal to said control winding the feedback current applied to said feedback winding being variable to change the compounding of said regulating system, the bias current applied to said bias winding being variable to change the bandwidth of said regulating system, and fifth means connected circuit relative between said fourth means and said driven apparatus to be responsive to said output signal for controlling the operation of said driven apparatus, said fifth means being connected in circuit relationship with said load winding of said magnetic amplifier.

6. In a voltage regulating system for an alternating current circuit including an induction voltage regulator having stationary and movable windings and a driven apparatus for changing the output voltage of said movable winding of said induction regulator by changing the relative positions of said stationary and movable windings, first means connected in circuit relation with said windings for obtaining a measure of said output voltage, second means connected in circuit relation with said first means for comparing said measure of said output voltage with a reference voltage to produce a net error voltage, third means connected in circuit relation with said second means to be responsive to values of said error voltage larger than a predetermined magnitude for producing substantially a predetermined output signal, said third means comprising a bistable magnetic amplifier having a load winding for producing said output signal and a control winding and a bias winding and a feedback winding, said error voltage being applied as an input signal to said control winding, the feedback current applied to said feedback winding being variable to change the compounding of said regulating system, the bias current applied to said bias winding being variable to change the bandwidth of said regulating system, and fourth means connected in circuit relation between said third means and said driven apparatus to be responsive to said output signal for controlling the operation of said driven apparatus, said fourth means being connected in circuit relationship with said load winding of said magnetic amplifier.

References Cited in the file of this patent

UNITED STATES PATENTS

| | | |
|---|---|---|
| 2,322,249 | Minneci | June 22, 1943 |
| 2,428,566 | Harder | Oct. 7, 1947 |
| 2,725,519 | Malick et al. | Nov. 29, 1955 |
| 2,752,556 | Webb | June 26, 1956 |
| 2,779,899 | Lennox | Jan. 29, 1957 |